US012407076B2

(12) United States Patent
Uemichi

(10) Patent No.: US 12,407,076 B2

(45) **Date of Patent: *Sep. 2, 2025**

(54) FILTER DEVICE

(71) Applicant: Fujikura Ltd., Tokyo (JP)

(72) Inventor: Yusuke Uemichi, Sakura (JP)

(73) Assignee: Fujikura Ltd., Tokyo (JP)

(*) Notice: Subject to any disclaimer, the term of this patent is extended or adjusted under 35 U.S.C. 154(b) by 113 days.

This patent is subject to a terminal disclaimer.

(21) Appl. No.: 18/019,017

(22) PCT Filed: Mar. 22, 2021

(86) PCT No.: PCT/JP2021/011615

§ 371 (c)(1),
(2) Date: Jan. 31, 2023

(87) PCT Pub. No.: WO2022/044405

PCT Pub. Date: Mar. 3, 2022

(65) Prior Publication Data

US 2023/0216165 A1 Jul. 6, 2023

(30) Foreign Application Priority Data

Aug. 25, 2020 (JP) ................................ 2020-142045

(51) Int. Cl.

*H01P 1/203* (2006.01)
*H01P 3/08* (2006.01)
*H01P 7/08* (2006.01)

(52) U.S. Cl.

CPC ...... *H01P 1/20345* (2013.01); *H01P 1/20336* (2013.01); *H01P 3/081* (2013.01); *H01P 7/082* (2013.01)

(58) Field of Classification Search

CPC ................. H01P 1/203; H01P 1/20327; H01P 1/20336; H01P 1/20345; H01P 1/20354; H01P 1/20363; H01P 1/20381

See application file for complete search history.

(56) References Cited

U.S. PATENT DOCUMENTS 3,879,690 A 4/1975 Golant et al.
5,028,896 A * 7/1991 Kuokkanen ............. H01P 7/084 333/263
5,343,176 A 8/1994 Hasler
2009/0231064 A1 9/2009 Bates et al.
2023/0049841 A1* 2/2023 Asahi ........................ H01P 7/08

FOREIGN PATENT DOCUMENTS

CN 1086356 A 5/1994
CN 1372379 A 10/2002

(Continued)

OTHER PUBLICATIONS

International Search Report dated May 18, 2021, issued in counterpart International application No. PCT/JP2021/011615, with English translation. (5 pages).

(Continued)

*Primary Examiner* — Stephen E. Jones
(74) *Attorney, Agent, or Firm* — WHDA, LLP

(57) ABSTRACT

An object of this invention is to reduce the size of a filter device. Provided is a filter device (1) including: a substrate (11) including a first main surface and a second main surface (111, 112); strip-shaped conductors (**12*a*1 to 12*a*5) provided to the first main surface (111); and a ground conductor layer (13) provided at least to the second main surface (112), the second main surface (112) having a recessed portion (11*ai*) provided for each strip-shaped conductor (12*ai*), the recessed portion (11*ai*) overlapping the strip-shaped conductor (12*ai*) in plan view and having a surface covered with the ground conductor layer (13**).

5 Claims, 6 Drawing Sheets

(56) References Cited

FOREIGN PATENT DOCUMENTS

| | | | |
|---|---|---|---|
| CN | 101071895 | A | 11/2007 |
| CN | 101630764 | A | 1/2010 |
| CN | 102394326 | A | 3/2012 |
| CN | 107134609 | A | 9/2017 |
| CN | 109449546 | A | 3/2019 |
| CN | 110495047 | A | 11/2019 |
| CN | 210167487 | U | 3/2020 |
| GB | 761787 | A | 11/1956 |
| JP | S62-196402 | U | 12/1987 |
| JP | H04-29203 | U | 3/1992 |
| JP | H06-37416 | A | 2/1994 |
| JP | H09-139605 | A | 5/1997 |
| JP | H10-22702 | A | 1/1998 |
| JP | 2006-109236 | A | 4/2006 |
| JP | 2011-050045 | A | 3/2011 |
| JP | 2015-015560 | A | 1/2015 |
| JP | 2019-176348 | A | 10/2019 |
| KR | 19990030747 | A | 5/1999 |

OTHER PUBLICATIONS

Written Opinion dated May 18, 2021, issued in counterpart International application No. PCT/JP2021/011615, with English translation. (8 pages).

International Search Report dated May 18, 2021, issued in related International application No. PCT/JP2021/011617, with English translation. (6 pages).

Written Opinion dated May 18, 2021, issued in related International application No. PCT/JP2021/011617, with English translation. (10 pages).

Non-Final Office Action dated Jan. 3, 2025, issued in U.S. Appl. No. 18/019,848. (11 pages).

Related co-pending U.S. Appl. No. 18/019,848.

Shen, Y. et al., Miniaturised substrate integrated waveguide cavities in dual-band filter and diplexer design, , IET Microwaves, Antennas & Propagation, vol. 14, Iss 5, p. 428-434, 2020. (7 pages); cited in CN Office Action dated Feb. 22, 2025.

Huang, J. et al., Novel Ultra-Wideband Bandpass Filters With a Simple Microstrip/CPW Structure, Chinese Journal of Electron Devices, vol. 36, No. 6, Dec. 2013, with English Abstract. (4 pages); cited in CN Office Action dated Feb. 22, 2025.

Xu, J. et al., Design of ultra-wideband filter based on couled CPW/Microstrip, Applied Science and Technology, vol. 40, No. 3, Jun. 2013, with English Abstract. (3 pages); cited in CN Office Action dated Feb. 22, 2025.

Office Action dated Feb. 22, 2025, issued in related CN Application No. 202180028838.X. (7 pages).

Ferrer, I. et al., A 60 GHz Image Rejection Filter Manufactured Using a High Resolution LTCC Screen Printing Process, 33ed European Microwave Conference—Munich 2003, p. 423-425. (4 pages); cited in CN Allowance dated Jun. 2, 2025.

* cited by examiner

FILTER DEVICE

TECHNICAL FIELD

The present invention relates to a filter device.

BACKGROUND ART

FIGS. 3 and 4 of Patent Literature 1 disclose, as a conventional example, a microstrip filter device (in Patent Literature 1, a resonant circuit device) including: a substrate made of a dielectric (in Patent Literature 1, a dielectric substrate 1); strip-shaped conductors which are provided to a first main surface of the substrate and adjacent ones of which are electromagnetically coupled to each other (in Patent Literature 1, resonant conductors 3 to 7); and a ground conductor layer provided to a second main surface of the substrate (in Patent Literature 1, a ground conductor 2). Note that each of the strip-shaped conductors functions as a resonator.

CITATION LIST

Patent Literature

Patent Literature 1

Japanese Patent Application Publication, Tokukaihei, No. 9-139605 (1997)

SUMMARY OF INVENTION

Technical Problem

In addition, FIG. 1 of Patent Literature 1 illustrates the filter device including recessed portions (in FIG. 1 of Patent Literature 1, trenches 11) that are provided in areas of the substrate which areas do not overlap the strip-shaped conductors (in FIG. 1 of Patent Literature 1, resonant conductors 5 and 6) in plan view and that are opened in the first main surface. With this configuration, since a specific inductive capacity of air filled in the recessed portions is smaller than a specific inductive capacity of the dielectric constituting the substrate, it is possible to reduce a degree of electromagnetic coupling between adjacent ones of the strip-shaped conductors. Thus, if the filter device is designed such that the degree of coupling between the adjacent ones of the strip-shaped conductors is substantially the same as those in conventional ones, a distance between the adjacent ones of the strip-shaped conductors can be reduced. Therefore, the filter device can be reduced in size. Such a filter device, however, is required to be further reduced in size.

An aspect of the present invention was made in consideration of the above-described problem, and has an object to reduce a filter device in size as compared to conventional ones.

Solution to Problem

A filter device in accordance with a first aspect of the present invention includes: a substrate which is made of a dielectric and which includes a first main surface and a second main surface facing each other; strip-shaped conductors which are provided to the first main surface and adjacent ones of which are electromagnetically coupled to each other; and a ground conductor layer provided at least to the second main surface, wherein in the second main surface of the substrate, one or more recessed portions are provided for each of the strip-shaped conductors, the one or more recessed portions overlapping the each of the strip-shaped conductors when seen in plan view, the one or more recessed portions having a surface covered with the ground conductor layer.

Advantageous Effects of Invention

A filter device in accordance with an aspect of the present invention can be reduced in size.

BRIEF DESCRIPTION OF DRAWINGS (a) of FIG. 1 is a plan view of a filter device in accordance with Embodiment 1 of the present invention. (b) and (c) of FIG. 1 are cross-section views of the filter device shown in (a) of FIG. 1.

FIG. 2 is a cross-section view of Variation 1 of the filter device shown in FIG. 1.

(a) and (b) of FIG. 3 are respectively a plan view and a cross-section view of Variation 2 of the filter device shown in FIG. 1.

Figure 6:
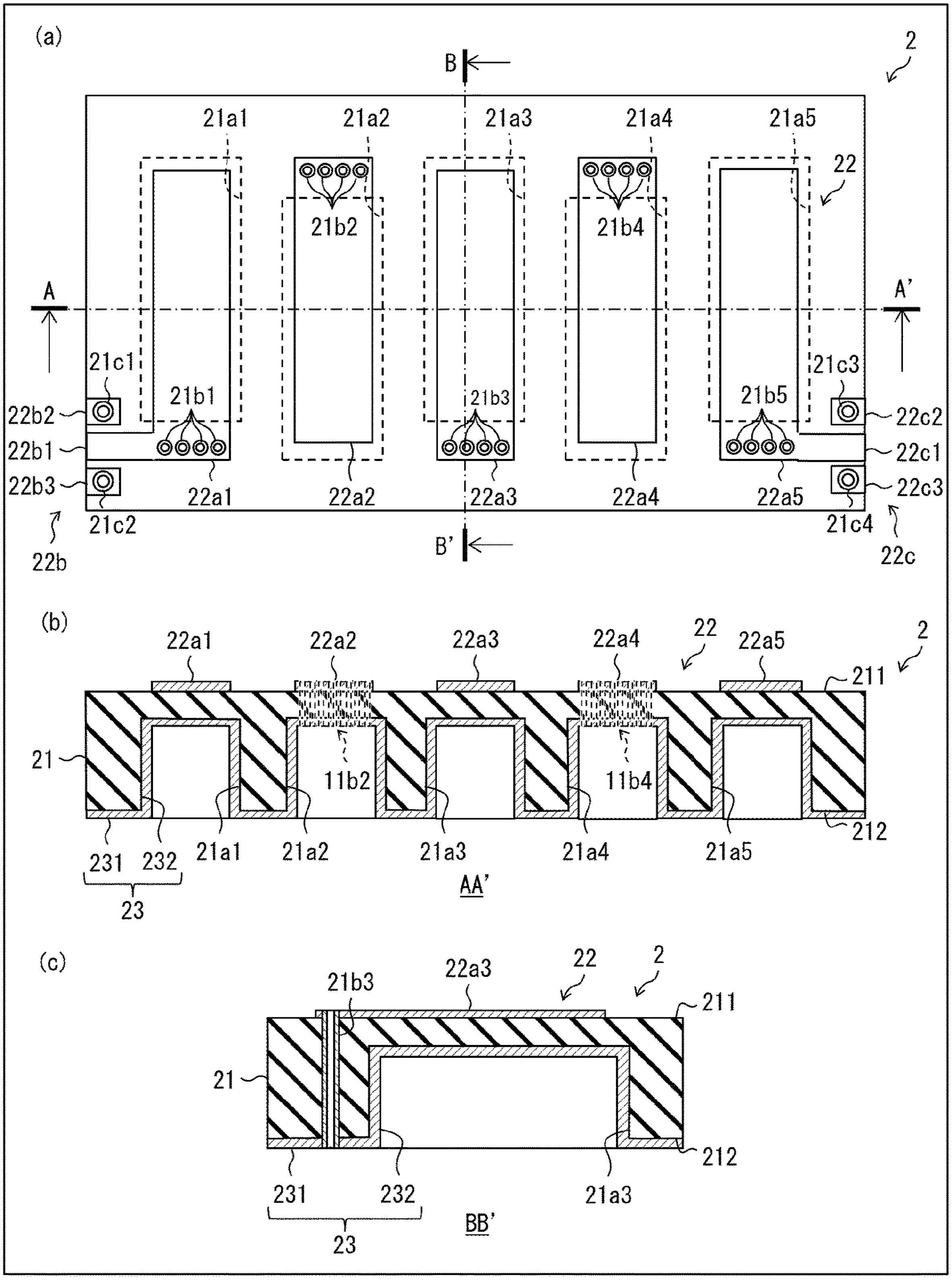

(a) of FIG. 6 is a plan view of a filter device in accordance with Embodiment 2 of the present invention. (b) and (c) of FIG. 6 are cross-section views of the filter device shown in (a) of FIG. 6.

Figure 7:
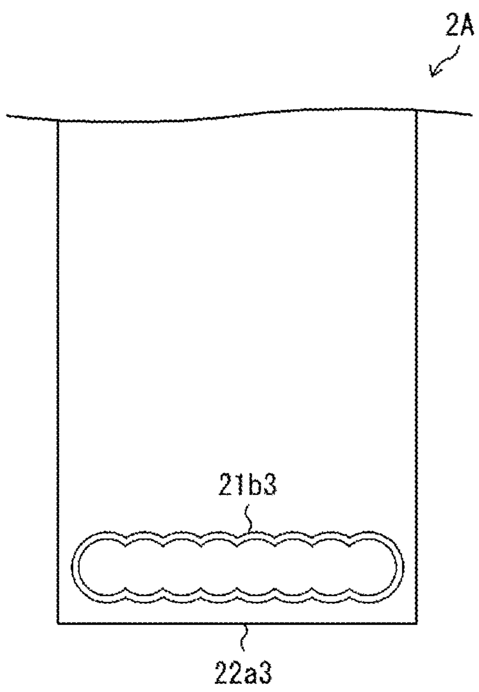

FIG. 7 is an enlarged plan view of one end portion of a strip-shaped conductor included in a variation of the filter device shown in FIG. 6.

Figure 8:
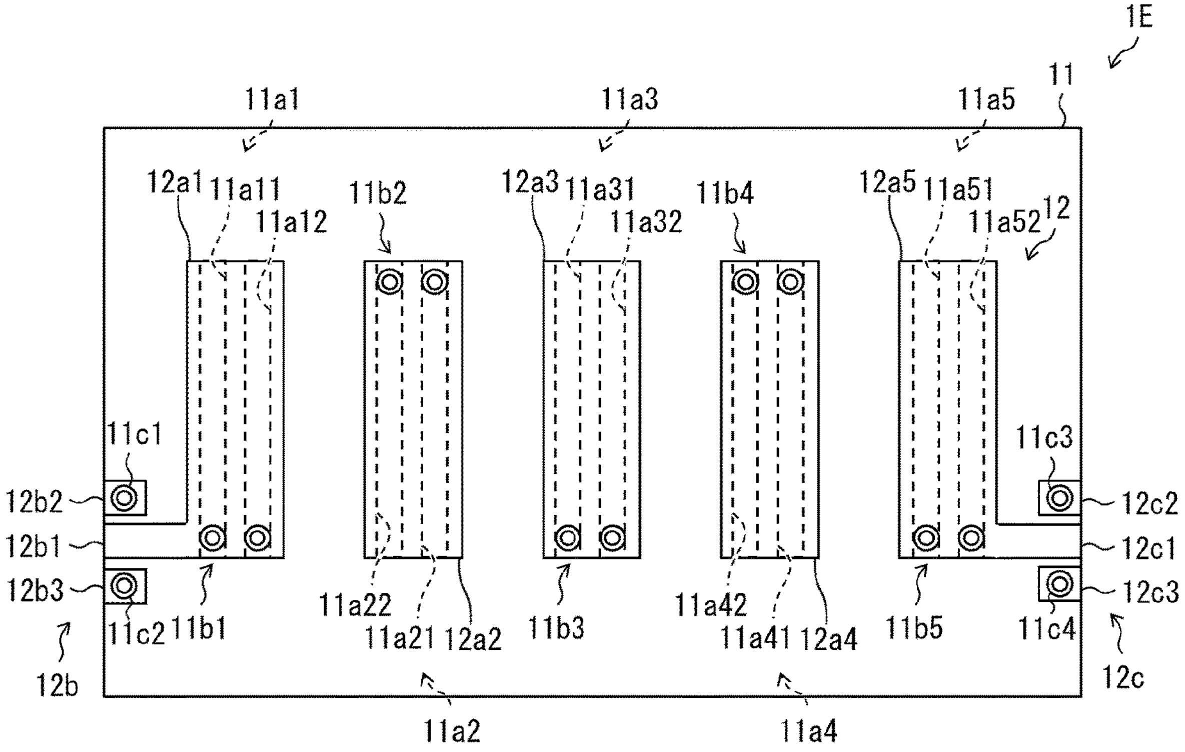

FIG. 8 is a plan view of a filter device in accordance with an Example of the present invention.

Figure 9:
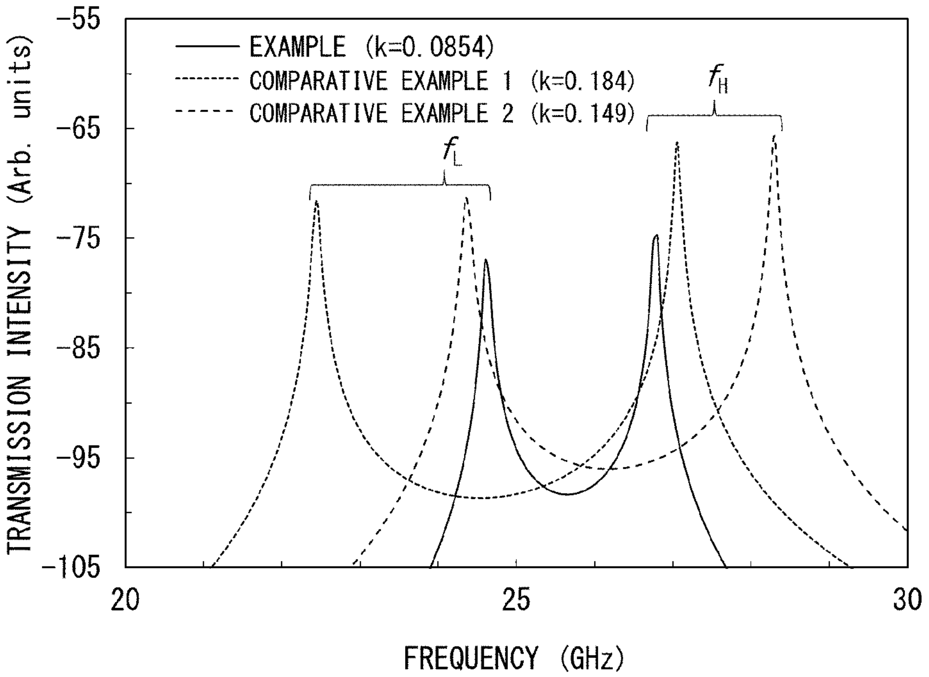

FIG. 9 is a graph illustrating frequency dependencies of transmission intensities of filter devices in accordance with the Example of the present invention, Comparative Example 1, and Comparative Example 2.

DESCRIPTION OF EMBODIMENTS

A filter device in accordance with an embodiment of the present invention functions as a bandpass filter that allows passage of, of high frequency signals having a frequency within a frequency band which is called a millimeter wave or a microwave, a high frequency signal within a given pass band and that blocks the other high frequency signals. The description of the later-described Embodiment 1 and Embodiment 2 will be given based on an assumption that a center frequency of the pass band is included in a 25-GHz band. However, the center frequency and the bandwidth of the pass band are not limited to any particular ones, and may be designed as appropriate according to the purpose of use of the filter device.

Embodiment 1

Figure 1:
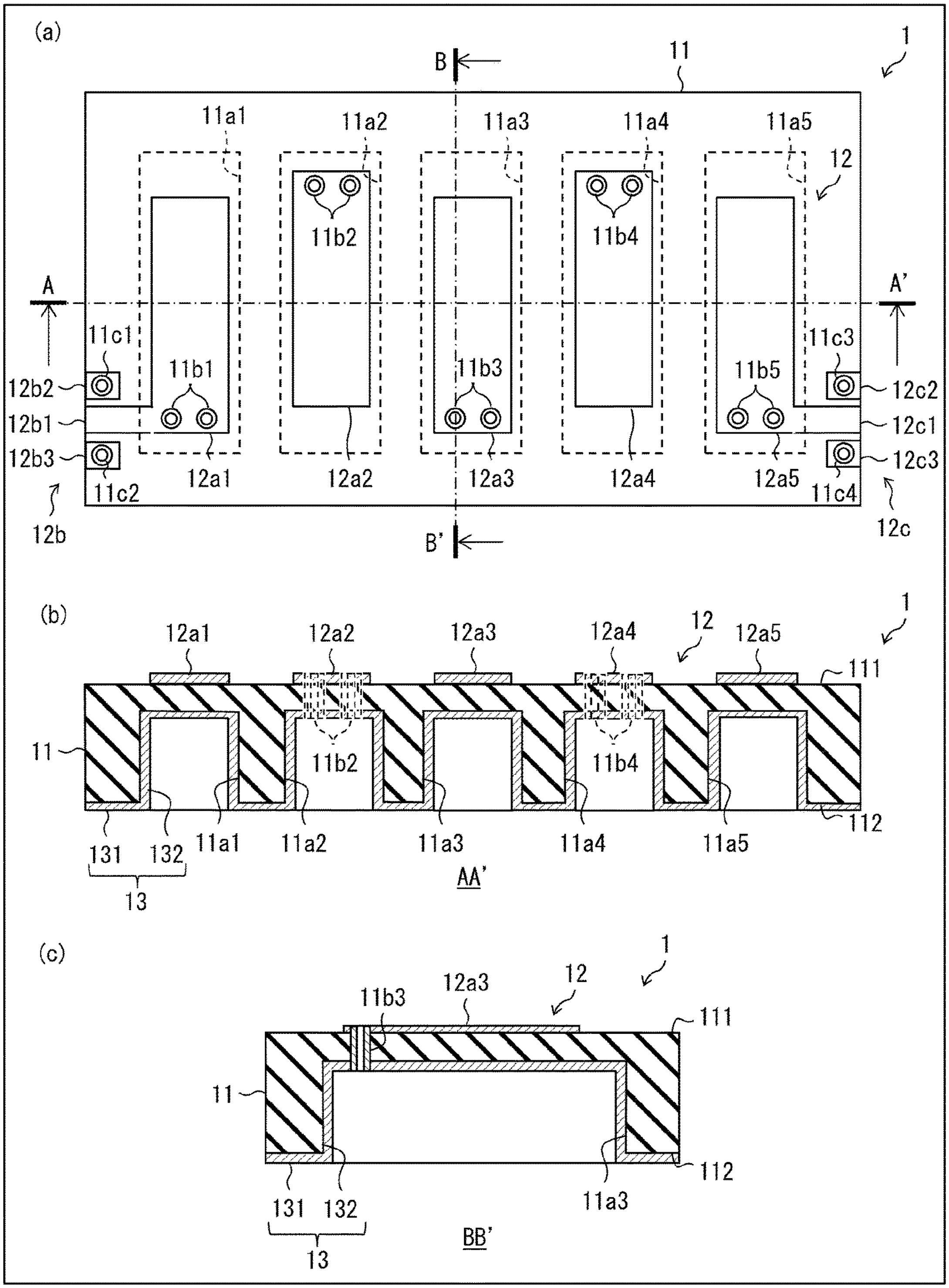

The following description will discuss, with reference to FIG. 1, a filter device in accordance with Embodiment 1 of the present invention. (a) of FIG. 1 is a plan view of the filter device 1. (b) and (c) of FIG. 1 are cross-section views of the filter device 1. (b) of FIG. 1 is a cross-section view illustrating a cross section taken along A-A' line shown in (a) of FIG. 1, and (c) of FIG. 1 is a cross-section view illustrating a cross section taken along B-B' line shown in (a) of FIG. 1.

<Configuration of Filter Device>

As shown in (a) to (c) of FIG. 1, the filter device 1 includes a substrate 11, a conductor pattern 12, and a ground conductor layer 13.

(Substrate)

The substrate 11 is a plate-like member which is made of a dielectric and which includes a main surface 111 and a main surface 112 facing each other. The main surface 111 is an example of the first main surface recited in the claims. The main surface 112 is an example of the second main surface recited in the claims.

In Embodiment 1, the substrate 11 is made of quartz. However, the dielectric constituting the substrate 11 is not limited to quartz, but can be selected as appropriate. Examples of the dielectric encompass glass other than quartz, ceramic, semiconductors such as silicon and GaAs, and resins.

In Embodiment 1, the substrate 11 has a rectangular shape when the main surface 111 is seen in plan view along a line normal to the main surface 111. However, the shape of the substrate 11 is not limited to the rectangular shape, but can be selected as appropriate. In the description below, the expression "seeing in plan view" refers to seeing the main surface 111 along a line normal to the main surface 111.

In Embodiment 1, the main surface 111 is provided with the later-described conductor pattern 12, and the main surface 112 is provided with the recessed portions **11*a*1 to 11*a*5 and the ground conductor layer 13 (described later). Alternatively, the conductor pattern 12 may be indirectly provided to the main surface 111 of the substrate 11, and the ground conductor layer 13 may be indirectly provided to the main surface 112 of the substrate 11. For example, another layer having a low conductivity (e.g., a dielectric layer) may be interposed (i) between the main surface 111 and the conductor pattern 12 and/or (ii) between the main surface 112 and the ground conductor layer 13. The substrate 11 includes, in its inside, the later-described conductor posts 11*b*1 to 11*b*5**.

(Conductor Pattern)

The conductor pattern 12 provided to the main surface 111 can be obtained by patterning of a conductor film into a given shape. In Embodiment 1, the conductor pattern 12 is made of copper. However, the conductor constituting the conductor pattern 12 is not limited to copper, but can be selected as appropriate. The conductor pattern 12 includes strip-shaped conductors **12*a*1 to 12*a*5, a coplanar line 12*b*, and a coplanar line 12*c*. In Embodiment 1, the conductor pattern 12 is constituted by five strip-shaped conductors 12*a*1 to 12*a*5. However, the number of strip-shaped conductors constituting the conductor pattern 12** is not limited to five.

As shown in (a) of FIG. 1, each of the strip-shaped conductors **12*a*1 to 12*a*5 has a rectangular shape. Hereinafter, a direction in which the strip-shaped conductors 12*a*1 (i is an integer of not less than one and not more than five) extend (i.e., a direction extending along longer sides of the strip-shaped conductors 12*a*1) will be referred to as a lengthwise direction. Meanwhile, a direction crossing the lengthwise direction (i.e., a direction extending along shorter sides of the strip-shaped conductors 12*a*1) will be referred to as a width direction. In each strip-shaped conductor 12*a*1**, a length measured in the lengthwise direction will be referred to as a length, whereas a length measured in the width direction will be referred to as a width.

The strip-shaped conductors **12*a*1 are arranged such that their longer sides are in parallel with each other. Further, the strip-shaped conductors 12*a*1 are arranged such that a distance between adjacent ones of the strip-shaped conductors has a certain value. Each of the strip-shaped conductors 12*a*1 arranged in this manner is electromagnetically coupled to another one of the strip-shaped conductors 12*a*1 adjacent to the each of the strip-shaped conductors 12*a*1**. A distance between adjacent ones of the strip-shaped conductors is adjusted as appropriate so that a degree of coupling between adjacent ones of the strip-shaped conductors attains a desired value.

When seen along the lengthwise direction of each strip-shaped conductor **12*a*1, a length of each strip-shaped conductor 12*a*1 can be defined as appropriate in accordance with a center frequency of a pass band and a specific inductive capacity of the substrate 11. In Embodiment 1, the length of each strip-shaped conductor 12*a*1 is defined to be a quarter of an effective wavelength of an electromagnetic wave whose frequency is equal to the center frequency. However, the length of each strip-shaped conductor 12*a*1** is not limited to the quarter of the effective wavelength, and may alternatively be an integral multiple of the quarter.

The coplanar line **12*b* is made of a signal line 12*b*1 and ground conductor patterns 12*b*2 and 12*b*3. One end portion of the signal line 12*b*1 is electrically connected to one end portion of the strip-shaped conductor 12*a*1. The ground conductor patterns 12*b*2 and 12*b*3 are disposed such that the signal line 12*b*1 is sandwiched therebetween. The coplanar line 12*b* functions as an input-output port of the filter device 1**.

The coplanar line **12*c* is made of a signal line 12*c*1 and ground conductor patterns 12*c*2 and 12*c*3. One end portion of the signal line 12*c*1 is electrically connected to one end portion of the strip-shaped conductor 12*a*5. The ground conductor patterns 12*c*2 and 12*c*3 are disposed such that the signal line 12*c*1 is sandwiched therebetween. The coplanar line 12*c* functions as an input-output port of the filter device 1**.

(Recessed Portion)

The recessed portions **11*a*1 to 11*a*5 provided to the main surface 112 respectively correspond to the strip-shaped conductors 12*a*1 to 12*a*5 facing thereto. Each recessed portion 11*ai* corresponding to its respective strip-shaped conductor 12*a*1 is disposed so as to overlap its respective strip-shaped conductor 12*a*1 when the main surface 111 is seen in plan view (see (a) of FIG. 1). In Embodiment 1, each recessed portion 11*ai* is disposed so as to cover its respective strip-shaped conductor 12*a*1. Note that each recessed portion 11*ai* only needs to at least partially overlap at least a part of its respective strip-shaped conductor 12*ai***.

Each recessed portion **11*ai* has a bottom surface and a side surface, which constitute a surface of the each recessed portion 11*ai* and which are covered with the later-described second ground conductor layer 132 (see (b) of FIG. 1**).

In Embodiment 1, each recessed portion **11*ai* has a rectangular parallelepiped shape. However, the shape of each recessed portion 11*ai*** is not limited to the rectangular parallelepiped, and can be selected as appropriate.

In Embodiment 1, a width of each recessed portion **11*ai* is greater than a width of a strip-shaped conductor 12*ai* corresponding to the recessed portion 11*ai*. Alternatively, the width of each recessed portion 11*ai* may be either smaller than or equal to the width of its respective strip-shaped conductor 12*ai***.

Note that a distance between each strip-shaped conductor **12*a*1 and the bottom surface of its respective recessed portion 11*ai* is adjusted as appropriate to give a desired degree of coupling between the each strip-shaped conductor 12*a*1 and a portion of the second ground conductor layer 132** which portion is provided to the bottom surface of its respective recessed portion 11*ai*.

In Embodiment 1, when seen along the lengthwise direction in which each strip-shaped conductor 12*ai* extends, a length of each recessed portion 11*ai* is longer than a length of its respective strip-shaped conductor 12*ai* overlapping, in plan view, the each recessed portion 11*ai* (see (c) of FIG. 1). When seen along the lengthwise direction of each strip-shaped conductor 12*a*1, each recessed portion 11*ai* covers its respective strip-shaped conductor 12*ai* overlapping the each recessed portion 11*ai* (see (a) of FIG. 1).

(Ground Conductor Layer)

The ground conductor layer 13 is provided at least on the main surface 112. To be more specific, as shown in (b) of FIG. 1, the ground conductor layer 13 is constituted by a first ground conductor layer 131 and a second ground conductor layer 132. The first ground conductor layer 131 refers to a portion of the ground conductor layer 13 which portion is provided to the main surface 112, whereas the second ground conductor layer 132 refers to a portion of the ground conductor layer 13 which portion covers a surface of each recessed portion 11*ai*.

The ground conductor layer 13 is made of a conductor film. In Embodiment 1, the ground conductor layer 13 is made of copper. However, the conductor constituting the ground conductor layer 13 is not limited to copper, but can be selected as appropriate.

As shown in (b) of FIG. 1, the first ground conductor layer 131 and the second ground conductor layer 132 are formed so as to be continuous to each other, and are electrically connected to each other. Thus, a potential of the first ground conductor layer 131 and a potential of the second ground conductor layer 132 are identical to each other.

(Conductor Post)

The conductor posts 11*b*1 to 11*b*5 respectively correspond to the strip-shaped conductors 12*a*1 to 12*a*5. Each conductor post 11*bi* corresponding to its respective strip-shaped conductor 12*a*1 is disposed in an area (in Embodiment 1, the one end portion) in which its respective strip-shaped conductor 12*a*1 and its respective recessed portion 11*ai* overlap each other when the main surface 111 is seen in plan view (see (a) of FIG. 1), and short-circuits the respective strip-shaped conductor 12*a*1 and the second ground conductor layer 132 (see the conductor posts 11*b*2 and 11*b*4 shown in (b) of FIG. 1).

Each conductor post 11*bi* can be obtained by forming a conductor film on an inner wall of a through-hole provided in an area of the substrate 11 which area corresponds to the one end portion of its respective strip-shaped conductor 12*a*1. Alternatively, each conductor post 11*bi* may be made of a conductor filled in the through-hole.

In Embodiment 1, when the main surface 111 is seen in plan view, each recessed portion 11*ai* covers it respective strip-shaped conductor 12*a*1. Thus, each conductor post 11*bi* is located inside its respective recessed portion 11*ai* in plan view. However, the position where each conductor post 11*bi* is provided is not limited to the position inside its respective recessed portion 11*ai*, and may alternatively be a position outside its respective recessed portion 11*ai* (i.e., the first ground conductor layer) or a position on an outer periphery (i.e., a side surface) of its respective recessed portion 11*ai*.

When seen in plan view, conductor posts 11*c*1, 11*c*2, 11*c*3, and 11*c*4 are respectively disposed in areas overlapping the ground conductor patterns 12*b*2, 12*b*3, 12*c*2, and 12*c*3. The conductor posts 11*c*1, 11*c*2, 11*c*3, and 11*c*4 respectively short-circuit the ground conductor patterns 12*b*2, 12*b*3, 12*c*2, and 12*c*3 to the first ground conductor layer 131.

Note that, in the filter device 1, each conductor post 11*bi* is constituted by two conductor posts. However, there is no limitation on the number of conductor posts constituting each conductor post 11*bi*, and the number of conductor posts constituting each conductor post 11*bi* may be one or three or more. A cross-sectional shape of the conductor post(s) constituting each conductor post 11*bi* is not limited to a circle.

<Variation 1>

Figure 2:
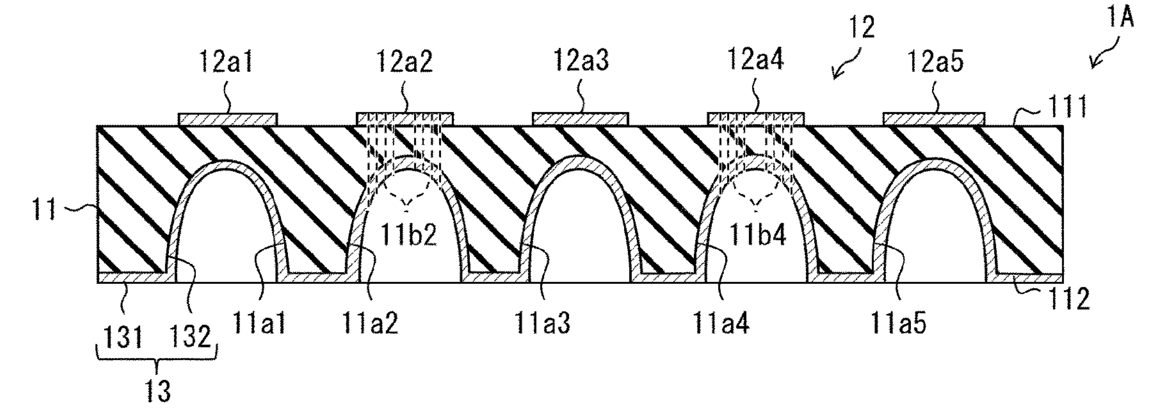

Next, the following description will discuss, with reference to FIG. 2, a filter device 1A, which is Variation 1 of the filter device 1 shown in FIG. 1. FIG. 2 is a cross-section view of the filter device 1A, and this cross-section view corresponds to the cross-section view of the filter device 1 shown in (b) of FIG. 1. Note that, for convenience, members of the filter device 1A having functions identical to those of the respective members described for the filter device 1 are given respective identical reference numerals, and a description of those members is omitted here. This also applies to the later-described variations.

The filter device 1A can be obtained by modifying the filter device 1 such that the shape of each recessed portion 11*ai* is changed from a rectangular parallelepiped shape to a half-pipe shape. The "half-pipe shape" herein refers to a shape obtained by cutting, along a center axis of the pipe and along a shorter axis of the ellipse, a pipe having an ellipse cross section into two.

In the filter device 1, each recessed portion 11*ai* has a rectangular parallelepiped shape. Therefore, a non-continuous angle is formed at a boundary between the bottom surface and the side surface of each recessed portion 11*ai* (see (b) of FIG. 1). Alternatively, the bottom surface and the side surface of each recessed portion 11*ai* may be smoothly connected to each other, as in the filter device 1A in accordance with Variation 1. Further alternatively, another variation of the filter device 1A can be obtained by modifying the filter device 1 such that each recessed portion 11*ai*, which has a rectangular parallelepiped shape, is transformed into a shape having a circular-arc (e.g., a half-circle) bottom surface.

Variation 1 can also bring about similar effects given by Embodiment 1. Furthermore, in a case where the recessed portions 11*ai* having a half-pipe shape are employed as in Variation 1, it is possible to bring about another effect of facilitating forming of a second ground conductor layer 132 having a uniform thickness in the recessed portions 11*ai*, as compared to a case where the recessed portions 11*ai* having a rectangular parallelepiped shape are employed.

<Variation 2>

Figure 3:
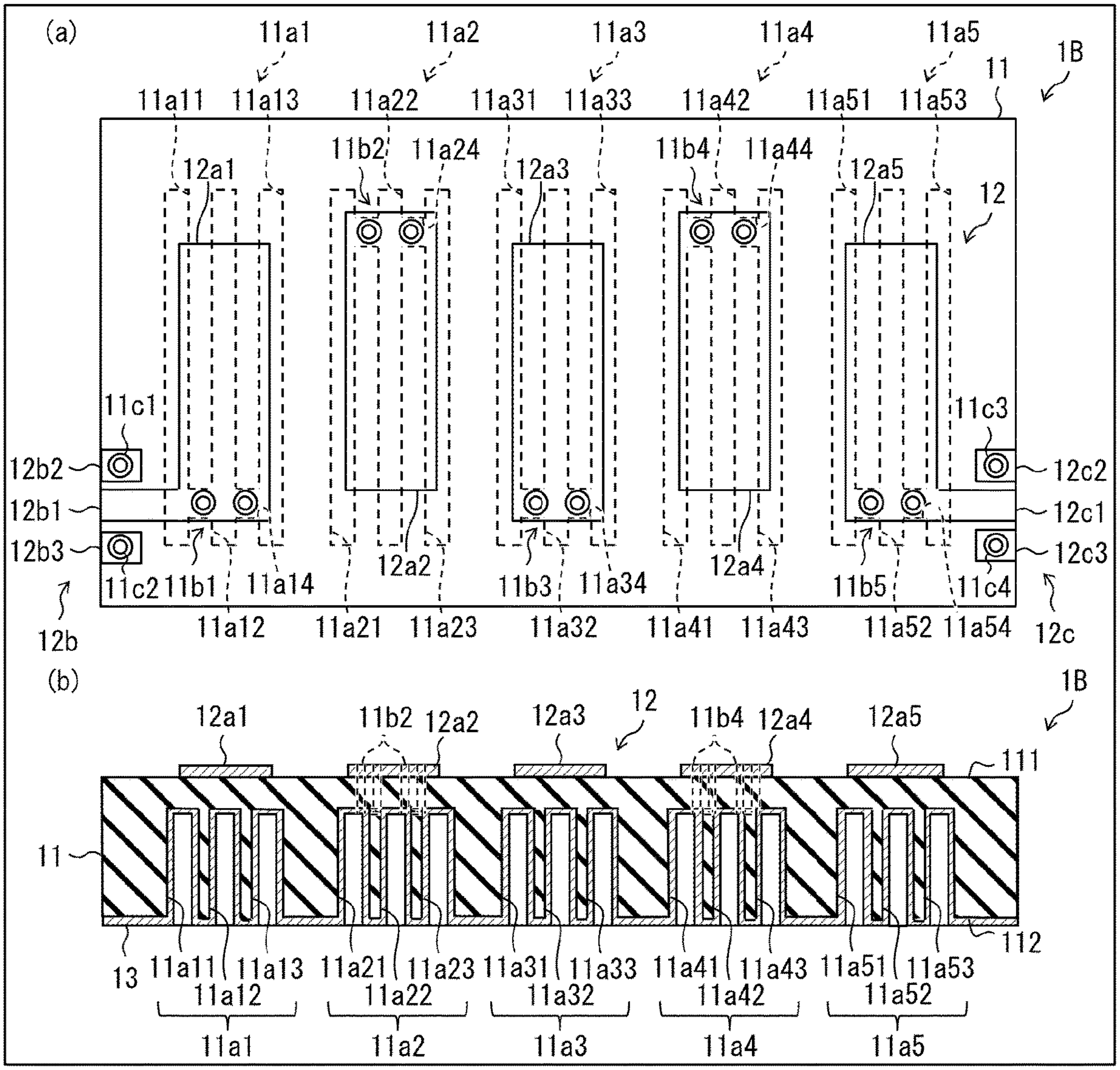

Next, the following description will discuss, with reference to FIG. 3, a filter device 1B, which is Variation 2 of the filter device 1 shown in FIG. 1. (a) of FIG. 3 is a plan view of the filter device 1B. (b) of FIG. 3 is an A-A' cross-section view of the filter device 1B, and this cross-section view corresponds to the cross-section view of the filter device 1 shown in (b) of FIG. 1.

The filter device 1B can be obtained by modifying the filter device 1 such that the shape of each recessed portion 11*ai* is changed from a rectangular parallelepiped shape to an E-shape when the main surface 111 is seen in plan view. Thus, the description in Variation 2 will discuss the shape of each recessed portion 11*ai*.

As shown in FIG. 3, each recessed portion 11*ai* of the filter device 1B is constituted by a first recessed portion

11*ai*1, a second recessed portion 11*ai*2, a third recessed portion 11*ai*3, and a fourth recessed portion 11*ai*4.

Each of the first recessed portion 11*ai*1, the second recessed portion 11*ai*2, and the third recessed portion 11*ai*3 has a rectangular parallelepiped shape, similarly to each recessed portion 11*ai* in the filter device 1. Note that each of the first recessed portion 11*ai*1, the second recessed portion 11*ai*2, and the third recessed portion 11*ai*3 has a width that is an approximately one-fifth of the width of each recessed portion 11*ai* in the filter device 1. Further, the first recessed portion 11*ai*1, the second recessed portion 11*ai*2, and the third recessed portion 11*ai*3 are disposed at equal intervals. Note that the width of each recessed portion 11*ai* in the filter device 1B is equal to the width of each recessed portion ai in the filter device 1.

The fourth recessed portion 11*ai*4 is disposed in an area including conductor posts 11*bi* when the main surface 111 is seen in plan view. The fourth recessed portion 11*ai*4 is disposed such that its longitudinal direction extends along a width direction of its respective strip-shaped conductor 12*a*1 so as to allow the first recessed portion 11*ai*1, the second recessed portion 11*ai*2, and the third recessed portion 11*ai*3 to communicate with each other via the fourth recessed portion 11*ai*4. A distance between (i) a bottom surface of the fourth recessed portion 11*ai*4 which bottom surface is an area being included in the bottom surface of the recessed portion 11*ai* and including the conductor posts 11*bi* and (ii) the main surface 111 is constant.

Note that the filter device 1B may not include the fourth recessed portion 11*ai*4. In this case, each recessed portion 11*ai* in the filter device 1B is constituted by three recessed portions, i.e., the first recessed portion 11*ai*1, the second recessed portion 11*ai*2, and the third recessed portion 11*ai*3.

Variation 2 can also bring about similar effects given by Embodiment 1. Furthermore, in a case where the recessed portions 11*ai* each constituted by a plurality of divided recessed portions are employed as in Variation 2, it is possible to bring about another effect of facilitating manufacturing of recessed portions, as compared to a case in which the recessed portions each constituted by a single recessed portion are employed. In addition, providing a plurality of small-width recessed portions can bring about further another effect of enhancing the strength of the substrate 11, as compared to the filter device 1. Note that the feature of the foregoing Variation 1 can also be applied to Variation 2. With this, Variation 2 can additionally bring about the effects of Variation 1.

<Variations 3 and 4>

Figure 4:
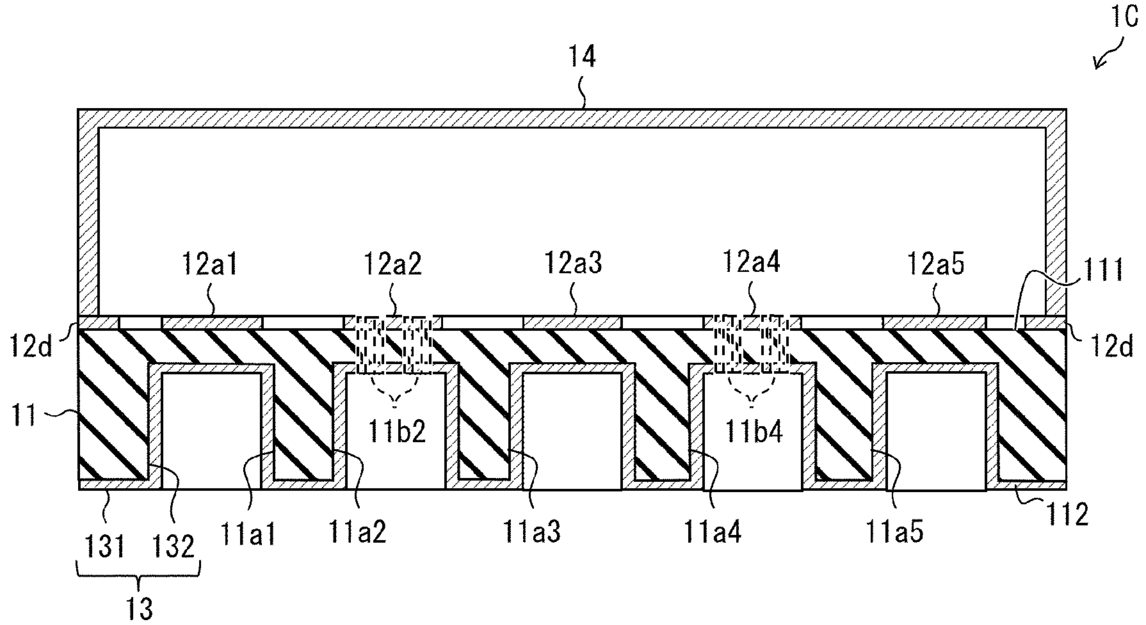
FIG. 4 is a cross-section view of Variation 3 of the filter device shown in FIG. 1.
Figure 5:
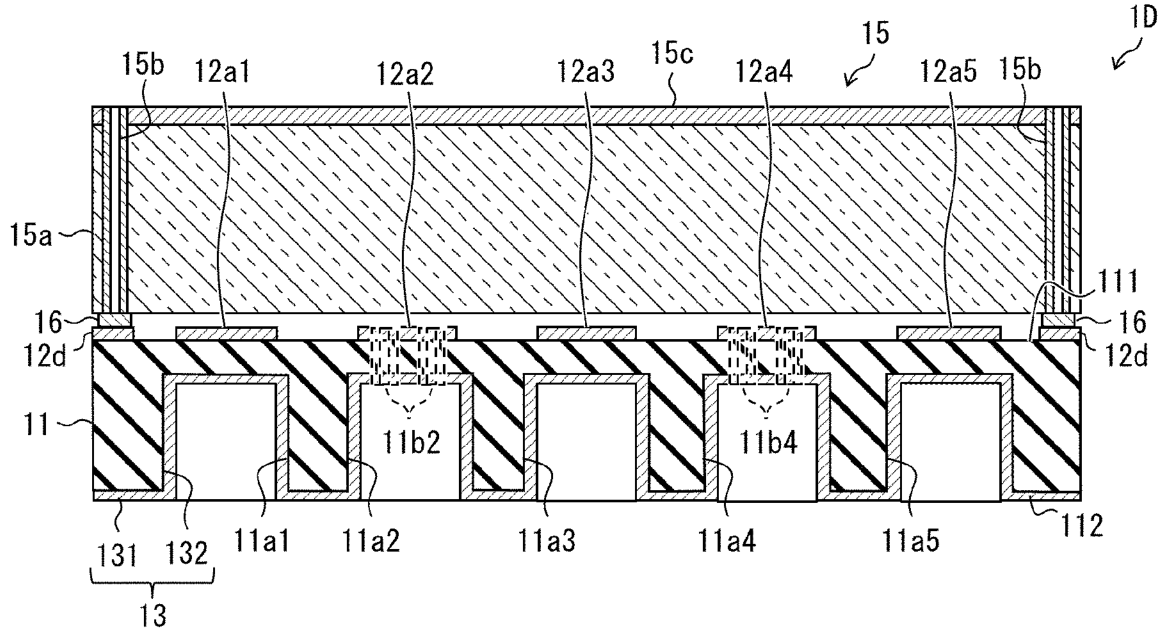
FIG. 5 is a cross-section view of Variation 4 of the filter device shown in FIG. 1.

Next, the following description will discuss, with reference to FIG. 4, a filter device 1C, which is Variation 3 of the filter device 1 shown in FIG. 1. In addition, the description of a filter device 1D, which is Variation 4 of the filter device 1 shown in FIG. 1, will also be given with reference to FIG. 5. FIG. 4 is a cross-section view of the filter device 1C, and this cross-section view corresponds to the cross-section view of the filter device 1 shown in (b) of FIG. 1. FIG. 5 is a cross-section view of the filter device 1D, and this cross-section view corresponds to the cross-section view of the filter device 1 shown in (b) of FIG. 1.

As shown in FIG. 4, the filter device 1C can be obtained by modifying the filter device 1 so as to further include a shield 14 made of a metal. The shield 14 can be obtained by forming (e.g., press forming) of a metal plate. The shield 14 has a top plate provided along a main surface 111 and a side wall provided to surround the sides of the top plate. The top plate covers strip-shaped conductors 12*a*1 while keeping a distance from the strip-shaped conductors 12*a*1. The side wall surrounds the sides of the strip-shaped conductors 12*ai*.

The main surface 111 of the substrate 11 constituting the filter device 1C is provided with a strip-shaped conductor 12*d* surrounding an outer periphery of the main surface 111. The strip-shaped conductor 12*d* is short-circuited to a first ground conductor layer 131 via a conductor post(s) not illustrated in FIG. 4.

A lower end of the side wall of the shield 14 is fixed to the strip-shaped conductor 12*d* by soldering (not illustrated in FIG. 4), which is an example of a connecting member. Note that the connecting member only needs to be a member having electric conductivity and being capable of fixing metal pieces to each other, and is not limited to the soldering. Another example of the connecting member is silver paste. The shield 14 configured in this manner is short-circuited to the first ground conductor layer 131 via the strip-shaped conductor 12*d* and the conductor post(s).

As shown in FIG. 5, a filter device 1D can be obtained by modifying the filter device 1 so as to further include a shield 15. The shield 15 includes a substrate 15*a* made of a dielectric, a plurality of conductor posts 15*b* provided in an outer periphery of the substrate 15*a* arranged in a fence-like manner, and a conductor layer 15*c*.

The conductor layer 15*c* is disposed so as to cover a main surface farther from the substrate 11 among a pair of main surfaces of the substrate 15*a*. The conductor layer 15*c* corresponds to the top plate of the shield 14, and covers strip-shaped conductors 12*a*1 while keeping a distance from the strip-shaped conductors 12*ai*.

Each of the conductor posts 15*b* can be obtained by forming a conductor film on an inner wall of a through-hole penetrating through the main surfaces of the substrate 15*a* or by filling a conductor in the through-hole. A center-to-center distance between adjacent ones of the conductor posts 15*b* can be defined as appropriate, and is preferably defined so as to be capable of reflecting an electromagnetic wave within a given pass band (e.g., 25 GHz band). The conductor posts arranged at intervals of such a center-to-center distance function as a post wall, and function similarly to the side wall of the shield 14.

Note that the filter device 1D employs a bump 16 as a connecting member for fixing the conductor posts 15*b* to a strip-shaped conductor 12*d*. However, the connecting member is not limited to the bump 16, and may alternatively be soldering or a solder ball.

Another Aspect of the Present Invention

The description in Embodiment 1 has dealt with the filter device 1, which is an aspect of the present invention. However, an aspect of the present invention is not limited to the filter device 1. That is, the present invention encompasses the below-described features of the filter device 1.

A transmission line that is an aspect of the present invention is a transmission line constituting a part of the filter device 1 shown in FIG. 1, and includes: a substrate 11 which is made of a dielectric and which includes a first main surface 111 and a second main surface 112 facing each other; a single strip-shaped conductor (here, a strip-shaped conductor 12*a*2) provided to the first main surface 111; and a ground conductor layer 13 provided at least on the second main surface 112. In the transmission line, the second main surface 112 has one or more recessed portions (here, a recessed portion 11*a*2) which overlap the strip-shaped conductor 12*a*2 in plan view and which have a surface covered with the second ground conductor layer 132 of the ground conductor layer 13. The transmission line is a microstrip transmission line. In this configuration, a distance between the strip-shaped conductor and the ground conductor layer can be reduced, as compared to a microstrip transmission line including: a substrate not provided with one or more recessed portions; a single strip-shaped conductor; and a ground conductor layer. Thus, the strip-shaped conductor can be reduced in width, which makes it possible to reduce the transmission line in size in a width direction of the strip-shaped conductor. Further, in a case where a microstrip transmission line configured as above is employed as each of transmission lines in a configuration in which the microstrip transmission lines are arranged in parallel, a distance between strip-shaped conductors in adjacent ones of the transmission lines can be reduced.

The transmission line functions as a resonator having a resonance frequency defined in accordance with the length of the strip-shaped conductor 12*a*2. Thus, the present invention encompasses a resonator including: a substrate 11 which is made of a dielectric and which includes a first main surface 111 and a second main surface 112 facing each other; a single strip-shaped conductor (here, a strip-shaped conductor 12*a*2) provided to the first main surface 111; and a ground conductor layer 13 provided at least on the second main surface 112, wherein the second main surface 112 has one or more recessed portions (here, a recessed portion 11*a*2) which overlap the strip-shaped conductor 12*a*1 in plan view and which has a surface covered with a second ground conductor layer 132 of the ground conductor layer 13. According to this configuration, a distance between the strip-shaped conductor and the ground conductor layer can be reduced, as compared to a microstrip resonator including: a substrate not provided with one or more recessed portions; a single strip-shaped conductor; and a ground conductor layer. Thus, the strip-shaped conductor can be reduced in width, which makes it possible to reduce the resonator in size in a width direction of the strip-shaped conductor. Further, in a case where a microstrip resonator configured as above is employed as each of microstrip resonators in a configuration in which the microstrip resonators are arranged substantially in parallel, a distance between strip-shaped conductors in adjacent ones of the resonators can be reduced.

A transmission line group that is an aspect of the present invention is a transmission line group constituting a part of the filter device 1 shown in FIG. 1, and includes: a substrate 11 which is made of a dielectric and which includes a first main surface 111 and a second main surface 112 facing each other; strip-shaped conductors (here, strip-shaped conductors 12*a*2 and 12*a*3) which are provided to the first main surface 111 and which are adjacent to each other; and a ground conductor layer 13 provided at least on the second main surface 112, wherein the second main surface 112 has one or more recessed portions (here, recessed portions 11*a*2 and 11*a*3) which are provided for each of the strip-shaped conductors (here, the strip-shaped conductors 12*a*2 and 12*a*3) so as to overlap the strip-shaped conductor 12*a*2 in plan view and which have a surface covered with a second ground conductor layer 132 of the ground conductor layer 13.

The transmission line group functions as a resonator group having a resonance frequency defined in accordance with lengths of the strip-shaped conductors 12*a*2 and 12*a*3. Thus, the present invention encompasses a resonator group including: a substrate 11 which is made of a dielectric and which includes a first main surface 111 and a second main surface 112 facing each other; strip-shaped conductors (here, strip-shaped conductors 12*a*2 and 12*a*3) which are provided to the first main surface 111 and which are adjacent to each other; and a ground conductor layer 13 provided at least to the second main surface 112, wherein the second main surface 112 has one or more recessed portions (here, recessed portions 11*a*2 and 11*a*3) which are provided for each of the strip-shaped conductors (here, the strip-shaped conductors 12*a*2 and 12*a*3), the one or more recessed portions overlapping the strip-shaped conductor 12*a*2 when seen in plan view and which have a surface covered with a second ground conductor layer 132 of the ground conductor layer 13.

An aspect of the present invention is not limited to the transmission line, the resonator, the transmission line group, or the resonator group each of which is limited to constitute a part of the filter device 1. Alternatively, an aspect of the present invention may be any of a transmission line, a resonator, a transmission line group, and a resonator group each of which constitutes a part of any of the filter device 1A, the filter device 1B, the later-described filter device 2, and the later-described filter device 2A.

Embodiment 2

The following description will discuss, with reference to FIG. 6, a filter device 2 in accordance with Embodiment 2 of the present invention. (a) of FIG. 6 is a plan view of the filter device 2. (b) and (c) of FIG. 6 are cross-section views of the filter device 2. (b) of FIG. 6 is a cross-section view illustrating a cross section taken along A-A' line shown in (a) of FIG. 6, and (c) of FIG. 6 is a cross-section view illustrating a cross section taken along B-B' line shown in (a) of FIG. 6.

<Configuration of Filter Device>

As shown in (a) to (c) of FIG. 6, the filter device 2 includes a substrate 21, a conductor pattern 22, and a ground conductor layer 23. The substrate 21, the conductor pattern 22, and the ground conductor layer 23 of the filter device 2 respectively correspond to the substrate 11, the conductor pattern 12, and the ground conductor layer 13 of the filter device 1. Therefore, the following description will discuss features of the filter device 2 that are different from those of the filter device 1, and does not discuss features of the filter device 2 that are identical to those of the filter device 1.

(Substrate)

Similarly to the substrate 11, the substrate 21 is a plate-like member which is made of a dielectric and which includes a main surface 211 and a main surface 212 facing each other. The main surface 211 and the main surface 212 respectively correspond to the main surface 111 and the main surface 112 of the substrate 11.

In Embodiment 2, the main surface 211 is provided with the later-described conductor pattern 22, and the main surface 212 is provided with the recessed portions 21*a*1 to 21*a*5 and the ground conductor layer 23 (described later). Alternatively, the conductor pattern 22 may be indirectly provided to the main surface 211 of the substrate 21, and the ground conductor layer 23 may be indirectly provided to the main surface 212 of the substrate 21. For example, another layer having a low conductivity (e.g., a dielectric layer) may be provided (i) between the main surface 211 and the conductor pattern 22 and/or (ii) between the main surface 212 and the ground conductor layer 23. The substrate 21 includes, in its inside, the later-described conductor posts 21*b*1 to 21*b*5.

(Conductor Pattern)

Similarly to the conductor pattern 12, the conductor pattern 22 provided to the main surface 211 can be obtained by patterning of a conductor film into a given shape. The conductor pattern 22 includes strip-shaped conductors 22*a*1 to 22*a*5, a coplanar line 22*b*, and a coplanar line 22*c*.

The strip-shaped conductors 22*a*1 to 22*a*5 are configured similarly to the strip-shaped conductors 12*a*1 to 12*a*5 in the filter device 1. Note that each strip-shaped conductor 22*ai* is configured to have a length shorter by a thickness of the substrate 21 than a length of each strip-shaped conductor 12*a*1 in the filter device 1. The reason for this is that each conductor post 21*bi* (described later) functions, together with each strip-shaped conductor 22*ai*, as a signal line of a two-conductor line.

The coplanar lines 22*b* and 22*c* are identical to the coplanar lines 12*b* and 12*c* in the filter device 1. Therefore, the coplanar lines 22*b* and 22*c* will not be described here.

(Recessed Portion)

The recessed portions 21*a*1 to 21*a*5 provided to the main surface 212 are configured similarly to the recessed portions 11*a*1 to 11*a*5 in the filter device 1. Thus, each recessed portion 21*ai* corresponds to its respective strip-shaped conductor 22*ai* facing the each recessed portion 21*ai*. Note that each recessed portion 21*ai* is configured to have a length shorter than a length of each recessed portion 11*ai* in the filter device 1. Thus, in the filter device 2, one end portion of each strip-shaped conductor 22*ai* protrudes from its respective recessed portion 21*ai* overlapping the each strip-shaped conductor 22*ai* in plan view (see (a) and (c) of FIG. 6).

When seen along a lengthwise direction of each strip-shaped conductor 22*ai* (see (c) of FIG. 6), a position where the recessed portion 21*ai* is to be provided is defined such that a distance between each conductor post 21*bi* (described later) and a portion of the second ground conductor layer 232 which portion is close to the conductor post 21*bi* is substantially equal to a distance between the strip-shaped conductor 22*ai* and the recessed portion 21*ai*. To be more specific, a position where each recessed portion 21*ai* is to be provided is defined such that a degree of coupling between its respective conductor post 21*bi* and the portion of the second ground conductor layer 232 which portion is close to the respective conductor post 21*bi* (i.e., a portion of the second ground conductor layer 232 which portion covers a side surface of the each recessed portion 21*ai*, the side surface is close to the each conductor post 21*bi*) is substantially equal to a degree of coupling between the respective strip-shaped conductor 22*ai* and a portion of the second ground conductor layer 232 which portion is provided in a bottom surface of the each recessed portion 21*ai*.

In Embodiment 2, each recessed portion 21*ai* has a rectangular parallelepiped shape. However, the shape of each recessed portion 21*ai* can be selected as appropriate, similarly to the shape of each recessed portion 11*ai*. The shape of each recessed portion 21*ai* may be identical to the shape of each recessed portion 11*ai* of the filter device 1A or to the shape of each recessed portion 11*ai* of the filter device 1B.

(Ground Conductor Layer)

As shown in (b) and (c) of FIG. 6, similarly to the ground conductor layer 13, the ground conductor layer 23 is constituted by a first ground conductor layer 231 and a second ground conductor layer 232. The first ground conductor layer 231 corresponds to the first ground conductor layer 131 of the ground conductor layer 13, and the second ground conductor layer 232 corresponds to the second ground conductor layer 132 of the ground conductor layer 13. The first ground conductor layer 231 refers to a portion of the ground conductor layer 23 which portion is provided to the main surface 212, whereas the second ground conductor layer 232 refers to a portion of the ground conductor layer 23 which portion covers a surface of each recessed portion 21*ai*.

(Conductor Post)

Similarly to the conductor posts 11*b*1 to 11*b*5 of the filter device 1, the conductor posts 21*b*1 to 21*b*5 respectively correspond to the strip-shaped conductors 22*a*1 to 22*a*5. When the main surface 211 is seen in plan view, each conductor post 21*bi* corresponding to its respective strip-shaped conductor 22*ai* is provided in an area where the one end portion of the respective strip-shaped conductor 22*ai* which one end portion protrudes from its respective recessed portion 21*ai* overlaps the later-described first ground conductor layer 231. Each conductor post 21*bi* short-circuits the one end portion and the first ground conductor layer 231. Each conductor post 21*bi* has a given degree of coupling with respect to a portion of the second ground conductor layer 232 which portion is close to the each conductor post 21*bi*. Thus, the each conductor post 21*bi* constitutes a two-conductor line, together with the portion of the second ground conductor layer 232.

As described above, in the filter device 2, not only each strip-shaped conductor 22*ai* but also each conductor post 21*bi* functions as a signal line of the two-conductor line. Thus, a length of each strip-shaped conductor 22*ai* can be reduced by a thickness of the substrate 21 than the length of each strip-shaped conductor 12*a*1 in the filter device 1.

In Embodiment 2, each conductor post 21*bi* is constituted by four conductor posts. However, there is no limitation on the number of conductor posts constituting each conductor post 21*bi*. In order to reduce a difference between a width of each strip-shaped conductor 22*ai* and an effective width of each conductor post 21*bi*, it is preferable to employ the following configuration. That is, (1) in a case where conductor posts constituting each conductor post 21*bi* are separated from each other, the sum of diameters of the conductor posts constituting the conductor post 21*bi* is close to the width of the strip-shaped conductor 22*ai*. Meanwhile, (2) in a case where conductor posts constituting each conductor post 21*bi* are integrated together, the width of the each conductor post 21*bi* (i.e., a length of each conductor post 21*bi* in the width direction of each strip-shaped conductor 22*ai*) is close to the width of the strip-shaped conductor 22*ai*.

<Variations>

The following description will discuss, with reference to FIG. 7, a filter device 2A, which is variation of the filter device 2 shown in FIG. 6. FIG. 7 is an enlarged plan view of one end portion of a strip-shaped conductor 22*a*3, which is one of strip-shaped conductors included in the filter device 2A. Note that, for convenience, members of the filter device 2A having functions identical to those of the respective members described for the filter device 2 are given respective identical reference numerals, and a description of those members is omitted here.

The filter device 2A can be obtained by modifying the filter device 2 so as to change the shape of each conductor post 21*bi*. FIG. 7 illustrates a conductor post 21*b*3 as an example of each conductor post 21*bi*. The other conductor posts 21*b*1, 21*b*2, 21*b*4, and 21*b*5 have identical configurations to the conductor post 21*b*3.

Specifically, each conductor post 21*bi* in the filter device 2 is constituted by four conductor posts each having a circular cross-sectional shape. Meanwhile, each conductor post 21*bi* in the filter device 2A is constituted by eight conductor posts each of which has a circular cross-sectional shapes and adjacent ones of which has a center-to-center distance shorter than a diameter of each conductor post. Thus, when seen along a width direction of each strip-shaped conductor 22*ai*, a width of each conductor post 21*bi* in the filter device 2A is substantially equal to a width of each strip-shaped conductor 22*ai*.

In Embodiment 2, the width of each conductor post 21*bi* is 92.5% of the width of each strip-shaped conductor 22*ai*. However, the width of each conductor post 21*bi* is not limited to this. In order to improve the degree of continuity between each strip-shaped conductor 22*ai* and each conductor post 21*bi*, the width of each conductor post 21*bi* is preferably in a range of not less than 80% and not more than 120% with respect to the width of each strip-shaped conductor 22*ai*.

EXAMPLES

The following description will discuss, with reference to FIGS. 8 and 9, a filter device 1E that is an Example of the present invention and a comparative example of the filter device 1. FIG. 8 is a plan view of the filter device 1E. FIG. 9 is a graph showing a result, obtained by simulation, of frequency dependencies of transmission intensities of the filter device 1E, Comparative Example 1, and Comparative Example 2. Hereinafter, the frequency dependency of the transmission intensity will be referred to as a transmission property.

The filter device 1E is a variation of the filter device 1B shown in FIG. 3. The filter device 1E was obtained by modifying the filter device 1B such that the recessed portions 11*ai* was changed from the ones seeming to have an E-shape in plan view to recessed portions 11*ai*1 and 11*ai*2, which were two independent recessed portions. Each of the recessed portions 11*ai*1 and 11*ai*2 had a rectangular parallelepiped shape. Note that each recessed portion 11*ai* in the filter device 1E did not include the fourth recessed portion 11*ai*4 provided in each recessed portion 11*ai* in the filter device 1B. Note also that a length of each of the recessed portions 11*ai*1 and 11*ai*2 was identical to a length of each strip-shaped conductor 12*ai*.

In this Example, the filter device 1E employed the following design parameters. Specifically, quartz glass was employed as a dielectric constituting a substrate 11. A specific inductive capacity thereof was 3.82, and a thickness of the substrate 11 was 400 μm. Each strip-shaped conductor 12*a*1 had a length of 1550 μm and a width of 350 μm. A distance between center axes of adjacent ones of the strip-shaped conductors 12*a*1 was 700 μm. The recessed portions 11*ai*1 and 11*ai*2 constituting each recessed portion 11*ai* each had a length of 1550 μm, a width of 100 μm, and a depth of 250 μm.

A filter device in accordance with Comparative Example 1 was obtained by modifying the filter device 1 so that the recessed portions 11*ai* were excluded therefrom. Thus, in Comparative Example 1, a main surface 112 was made of a flat surface, and a ground conductor layer 13 was made only of a first ground conductor layer 131. In the filter device in accordance with Comparative Example 1, adjacent ones of strip-shaped conductors were arranged in a manner as illustrated in FIG. 4 of Patent Literature 1. A filter device in accordance with Comparative Example 2 was obtained by modifying the filter device in accordance with Comparative Example 1 such that each recessed portion was provided in an area of a main surface 111 in which no strip-shaped conductor 12*a*1 was provided and which was sandwiched between adjacent ones of the strip-shaped conductors. The filter device in accordance with Comparative Example 2 corresponds to the filter device illustrated in FIG. 1 of Patent Literature 1.

In a configuration in which each of the strip-shaped conductors functions as a resonator and adjacent ones of the strip-shaped conductors are electromagnetically coupled to each other, as in the filter device 1 and the filter devices of Comparative Examples, it is known that a coupling coefficient k between the resonators is expressed by the following formula (1):

$$k = \frac{f_h^2 - f_l^2}{f_h^2 + f_l^2} \tag{1}$$

Here, the coupling coefficient k is an indicator indicating a degree of coupling between the resonators. A greater coupling coefficient k indicates a higher degree of coupling between the resonators. In formula (1), $f_h$ denotes a resonance frequency on a higher frequency side, and $f_l$ denotes a resonance frequency on a lower frequency side.

As shown in FIG. 9, coupling coefficients k obtained from the transmission properties of the Example, Comparative Example 1, and Comparative Example 2 were 0.0854, 0.184, and 0.149, respectively. This reveals the following. That is, in a case where the filter device 1E of the Example is designed such that the degree of coupling between adjacent ones of the strip-shaped conductors 12*ai* is substantially equal to those of the filter devices of the Comparative Examples, a distance between adjacent ones of the strip-shaped conductors 12*a*1 can be reduced in the filter device 1E, as compared to those in the filter devices of Comparative Examples 1 and 2. That is, the above result reveals that the filter device 1E can be more reduced in size than the filter devices of Comparative Examples 1 and 2.

Aspects of the present invention can also be expressed as follows:

A filter device in accordance with a first aspect of the present invention includes: a substrate which is made of a dielectric and which includes a first main surface and a second main surface facing each other; strip-shaped conductors which are provided to the first main surface and adjacent ones of which are electromagnetically coupled to each other; and a ground conductor layer provided at least to the second main surface, wherein in the second main surface of the substrate, one or more recessed portions are provided for each of the strip-shaped conductors, the one or more recessed portions overlapping the each of the strip-shaped conductors when seen in plan view, the one or more recessed portions having a surface covered with the ground conductor layer.

As compared to a filter device including a substrate without a recessed portion (e.g., the filter device illustrated in FIG. 3 of Patent Literature 1), the above configuration can reduce a distance between adjacent ones of the strip-shaped conductors when the filter device is designed such that a degree of coupling between the adjacent ones of the strip-shaped conductors is substantially equal to those of the conventional ones. Thus, the filter device can be reduced in size. The reason for this is as follows. That is, as compared to the filter device including the substrate without a recessed portion, the above configuration involves a shorter distance between each strip-shaped conductor and a portion of the ground conductor layer which portion is closest to the each strip-shaped conductor, and accordingly lines of electric force generated between the strip-shaped conductors and the ground conductor layer are concentrated in a direction normal to the first main surface and are hardly expanded in an in-plane direction of the first main surface.

A filter device in accordance with a second aspect of the present invention employs, in addition to the feature of the filter device in accordance with the first aspect above, a feature wherein: when seen along a lengthwise direction in which the strip-shaped conductors extend, each of the recessed portions (i) has a length longer than a length of one of the strip-shaped conductors overlapping the recessed portion in the plan view and (ii) covers the one of the strip-shaped conductors.

With the above configuration, the ground conductor layer provided to the bottom surfaces of the recessed portions has a sufficient size as a ground conductor layer constituting a microstrip line.

A filter device in accordance with a third aspect of the present invention employs, in addition to the feature of the filter device in accordance with the first or second aspect above, a feature wherein: the second main surface of the substrate has recessed portions provided for each of the strip-shaped conductors, the recessed portions overlapping the each of the strip-shaped conductors when seen in plan view, the recessed portions having a surface covered with the ground conductor layer.

With the above configuration, it is possible to reduce the volume of each recessed portion provided to the substrate, thereby making it possible to reduce the number of steps, time, and/or the like required to form the recessed portions.

A filter device in accordance with a fourth aspect of the present invention employs, in addition to the feature of the filter device in accordance with any one of the first to third aspects above, a feature wherein: one or more conductor posts are provided, for each of the strip-shaped conductors, in an area where the each of the strip-shaped conductors and a respective one of the recessed portions overlap each other in the plan view, the one or more conductor posts short-circuiting the each of the strip-shaped conductors and the ground conductor layer.

With the above configuration, it is possible to short-circuit the strip-shaped conductors and the recessed portions via the short conductor posts, thereby making it possible to provide a one-end short-circuited strip resonator having a minimum reactance.

A filter device in accordance with a fifth aspect of the present invention employs, in addition to the feature of the filter device in accordance with the fourth aspect above, a feature wherein: the one or more conductor posts are disposed in an area overlapping the respective one of the recessed portions in plan view, and a distance between (i) an area of a bottom surface of the respective one of the recessed portions which area includes the one or more conductor posts and (ii) the first main surface is constant.

With the above configuration, the one or more conductor posts are short-circuited to the ground conductor layer only via the bottom surface of the recessed portion. Therefore, it is possible to simplify the shape(s) of the one or more conductor posts. Furthermore, it is possible to achieve the one or more conductor posts having a constant length.

A filter device in accordance with a sixth aspect of the present invention employs, in addition to the feature of the filter device in accordance with the first aspect above, a feature wherein: a portion of the ground conductor layer which portion is provided to the second main surface is designated as a first ground conductor layer and a portion of the ground conductor layer which portion covers the surface of the recessed portions is designated as a second ground conductor layer; one end portion of each of the strip-shaped conductors protrudes from one of the recessed portions overlapping the strip-shaped conductor in the plan view; and one or more conductor posts are further provided for each of the strip-shaped conductors, the one or more conductor posts being disposed in an area where the one end portion and the first ground conductor layer overlap each other in the plan view, the one or more conductor posts short-circuiting the one end portion and the first ground conductor layer, the one or more conductor posts constituting a two-conductor line together with a portion of the second ground conductor layer which portion covers a side surface of a corresponding one of the recessed portions.

With the above configuration, in addition to the feature wherein each strip-shaped conductor and the portion of the second ground conductor layer which portion is provided to the bottom surface of it respective recessed portion function as a two-conductor line, the one or more conductor posts and the portion of the second ground conductor layer which portion is provided to the side surface of its respective recessed portion also function as a two-conductor line. Thus, in the filter device in accordance with the sixth aspect, the strip-shaped conductors can be reduced in length in the lengthwise direction. Consequently, the filter device can also be reduced in size in the lengthwise direction.

A filter device in accordance with a seventh aspect of the present invention employs, in addition to the feature of the filter device in accordance with the sixth aspect above, a feature wherein: when each of the strip-shaped conductors is seen along a width direction crossing the direction in which the each of the strip-shaped conductors extends, the one or more conductor posts have a width substantially equal to a width of the each of the strip-shaped conductors.

With the above configuration, it is possible to reduce a degree of discontinuity that can occur at a connection point where the strip-shaped conductor and the conductor post, which function as a signal line of the two-conductor line, are connected to each other. Consequently, it is possible to enhance the functionality of the two-conductor line.

A filter device in accordance with an eighth aspect of the present invention employs, in addition to the feature of the filter device in accordance with any one of the first to eighth aspects above, a feature wherein: the filter device further includes a shield which is made of a metal and which covers the strip-shaped conductors while keeping a distance from the strip-shaped conductors.

With the above configuration, even if a metal object gets closer to the strip-shaped conductors from the first main surface side, the shield can shield the strip-shaped conductors from the metal object. Thus, it is possible to reduce a change in filter characteristics that may otherwise occur in such a case.

Supplementary Notes

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1, 2: filter device
11, 21: substrate

111, 211: main surface (first main surface)
112, 212: main surface (second main surface)
11*a*1 to 11*a*5, 21*a*1 to 21*a*5: recessed portion
11*b*1 to 11*b*5, 11*c*1 to 11*c*4, 21*b*1 to 21*b*5, 21*c*1 to 21*c*4: conductor post
12, 22: conductor pattern
12*a*1 to 12*a*5, 22*a*1 to 22*a*5: strip-shaped conductor
12*b*, 12*c*, 22*b*, 22*c*: coplanar line
12*b*1, 12*c*1, 22*b*1, 22*c*1: signal line
12*b*2, 12*b*3, 12*c*2, 12*c*3, 22*b*2, 22*b*3, 22*c*2, 22*c*3: ground conductor pattern
13, 23: ground conductor layer
131, 231: first ground conductor layer
132, 232: second ground conductor layer

The invention claimed is:

1. A filter device comprising:
a substrate which is made of a dielectric and which includes a first main surface and a second main surface facing each other;
strip-shaped conductors which are provided to the first main surface and adjacent ones of which are electromagnetically coupled to each other; and
a ground conductor layer provided at least to the second main surface, wherein
in the second main surface of the substrate, one or more recessed portions are provided for each of the strip-shaped conductors, the one or more recessed portions overlapping the each of the strip-shaped conductors when seen in plan view, the one or more recessed portions having a surface covered with the ground conductor layer,
wherein:
when seen along a lengthwise direction in which the strip-shaped conductors extend, each of the recessed portions (i) has a length longer than a length of one of the strip-shaped conductors overlapping the recessed portion in the plan view and (ii) covers the one of the strip-shaped conductors.

2. The filter device as set forth in claim 1, wherein:
one or more conductor posts are provided, for each of the strip-shaped conductors, in an area where the each of the strip-shaped conductors and a respective one of the recessed portions overlap each other in the plan view, the one or more conductor posts short-circuiting the each of the strip-shaped conductors and the ground conductor layer.

3. The filter device as set forth in claim 1, further comprising:
a shield which is made of a metal and which covers the strip-shaped conductors while keeping a distance from the strip-shaped conductors.

4. A filter device comprising:
a substrate which is made of a dielectric and which includes a first main surface and a second main surface facing each other;
strip-shaped conductors which are provided to the first main surface and adjacent ones of which are electromagnetically coupled to each other; and
a ground conductor layer provided at least to the second main surface, wherein
in the second main surface of the substrate, one or more recessed portions are provided for each of the strip-shaped conductors, the one or more recessed portions overlapping the each of the strip-shaped conductors when seen in plan view, the one or more recessed portions having a surface covered with the ground conductor layer,
wherein:
a portion of the ground conductor layer which portion is provided to the second main surface is designated as a first ground conductor layer and a portion of the ground conductor layer which portion covers the surface of the recessed portions is designated as a second ground conductor layer;
one end portion of each of the strip-shaped conductors protrudes from one of the recessed portions overlapping the strip-shaped conductor in the plan view; and
one or more conductor posts are further provided for each of the strip-shaped conductors, the one or more conductor posts being disposed in an area where the one end portion and the first ground conductor layer overlap each other in the plan view, the one or more conductor posts short-circuiting the one end portion and the first ground conductor layer, the one or more conductor posts constituting a two-conductor line together with a portion of the second ground conductor layer which portion covers a side surface of a corresponding one of the recessed portions.

5. The filter device as set forth in claim 4, further comprising:
a shield which is made of a metal and which covers the strip-shaped conductors while keeping a distance from the strip-shaped conductors.

* * * * *